(12) United States Patent
Kim

(10) Patent No.: US 9,635,304 B2
(45) Date of Patent: Apr. 25, 2017

(54) MOUNTING CURVED DISPLAY DEVICE ON A CURVED PATH AND MOVING ALONG THE PATH

(71) Applicant: SAMSUNG ELECTRONICS CO., LTD., Suwon-si (KR)

(72) Inventor: In-beom Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 14/308,250

(22) Filed: Jun. 18, 2014

(65) Prior Publication Data

US 2015/0097923 A1      Apr. 9, 2015

(30) Foreign Application Priority Data

Oct. 8, 2013    (KR) .......................... 10-2013-0120052

(51) Int. Cl.
*H04N 5/655*       (2006.01)
*H04N 5/44*        (2011.01)
(Continued)

(52) U.S. Cl.
CPC ......... *H04N 5/655* (2013.01); *G06K 9/00228* (2013.01); *H04N 5/4403* (2013.01);
(Continued)

(58) Field of Classification Search
CPC .............. H04N 5/655; H04N 21/44218; H04N 21/4223; H04N 5/64; H04N 5/645; H04N 5/4403; H04N 2005/4432; G06K 9/00228
See application file for complete search history.

(56) References Cited

U.S. PATENT DOCUMENTS 5,331,413 A  *   7/1994  Diner ..................... H04N 7/181
                                                        348/114
8,827,227 B2 *   9/2014  Nagaoka ................ F16M 11/08
                                                        248/346.01
(Continued)

FOREIGN PATENT DOCUMENTS

DE        202013100638 U1      3/2013
JP          2006-72177 A       3/2006
(Continued)

OTHER PUBLICATIONS

Communication issued Mar. 9, 2016, issued by the European Patent Office in counterpart European Patent Application No. 14170679.6.
(Continued)

*Primary Examiner* — Jay Patel
*Assistant Examiner* — Joseph Suh
(74) *Attorney, Agent, or Firm* — Sughrue Mion, PLLC

(57) ABSTRACT

A display apparatus and a display method using the same are provided. The display apparatus includes a curved display, a guide member on which the curved display is mounted to slidably move and configured to provide a curved concave path formed with respect to a user, and a driver configured to move the curved display along the guide member. The guide member includes left and right frames vertically disposed at intervals, a lower rail of which both ends are coupled to lower ends of the left and right frames, and an upper rail of which both ends are coupled to upper ends of the left and right frames and which is parallel to the lower rail.

15 Claims, 11 Drawing Sheets

(51) Int. Cl.
  *H04N 5/645* (2006.01)
  *G06K 9/00* (2006.01)
  *H04N 5/64* (2006.01)
  *H04N 21/4223* (2011.01)
  *H04N 21/442* (2011.01)

(52) U.S. Cl.
  CPC .............. *H04N 5/64* (2013.01); *H04N 5/645* (2013.01); *H04N 21/4223* (2013.01); *H04N 21/44218* (2013.01); *H04N 2005/4432* (2013.01)

(56) References Cited

U.S. PATENT DOCUMENTS

| | | | |
|---|---|---|---|
| 2002/0139072 A1* | 10/2002 | Laskowski | E04B 2/7457 52/245 |
| 2003/0130035 A1* | 7/2003 | Kanarat | A63F 13/10 463/31 |
| 2004/0002984 A1* | 1/2004 | Hasegawa | G06T 3/40 |
| 2004/0239890 A1* | 12/2004 | Starkweather | G03B 21/62 353/69 |
| 2005/0041211 A1 | 2/2005 | Streid et al. | |
| 2006/0219702 A1* | 10/2006 | Lee | H05K 5/0017 219/506 |
| 2007/0234644 A1* | 10/2007 | Jaeger | E05D 15/10 49/362 |
| 2008/0210416 A1* | 9/2008 | Lesko | E21B 7/023 166/85.5 |
| 2009/0047110 A1* | 2/2009 | Wilkie | B66F 9/06 414/592 |
| 2009/0073326 A1* | 3/2009 | Jang | F16M 11/08 348/836 |
| 2009/0091681 A1 | 4/2009 | Nishizawa et al. | |
| 2009/0167840 A1* | 7/2009 | Lin | H04L 12/581 348/14.08 |
| 2010/0090077 A1* | 4/2010 | Grabania | F16M 11/08 248/296.1 |
| 2010/0185990 A1* | 7/2010 | Ha | G06F 3/01 715/863 |
| 2011/0084187 A1* | 4/2011 | Muday | F16M 11/10 248/284.1 |
| 2011/0174944 A1* | 7/2011 | Fredette | F16M 13/02 248/220.22 |
| 2011/0234640 A1* | 9/2011 | Ishida | G06K 9/00221 345/671 |
| 2011/0303803 A1* | 12/2011 | Skinner | F16M 11/046 248/122.1 |
| 2012/0075166 A1 | 3/2012 | Marti et al. | |
| 2012/0194988 A1 | 8/2012 | Pan | |
| 2012/0229596 A1 | 9/2012 | Rose et al. | |
| 2013/0050403 A1 | 2/2013 | Jang | |
| 2013/0081902 A1* | 4/2013 | Liao | E04G 3/28 182/20 |
| 2013/0206505 A1* | 8/2013 | Tremblay | A62B 1/02 182/18 |
| 2013/0299651 A1* | 11/2013 | McGowan | F16M 13/02 248/201 |
| 2014/0021312 A1* | 1/2014 | Nguyen | F16M 11/10 248/205.1 |
| 2014/0160165 A1* | 6/2014 | Kim | G06T 19/006 345/633 |
| 2014/0209740 A1* | 7/2014 | Guering | B64D 43/00 244/118.5 |
| 2014/0267557 A1* | 9/2014 | McArdle | G06F 1/1601 348/14.08 |
| 2014/0289649 A1* | 9/2014 | Vogelmeier | G06F 3/013 715/757 |
| 2014/0346297 A1* | 11/2014 | Pei | F16M 11/10 248/223.31 |

FOREIGN PATENT DOCUMENTS

| | | |
|---|---|---|
| JP | 2008220533 A | 9/2008 |
| JP | 2011237626 A | 11/2011 |
| KR | 20-2008-0006708 U | 12/2008 |
| KR | 10-2009-0079474 A | 7/2009 |
| KR | 1020110065072 A | 6/2011 |
| WO | 2011126331 A2 | 10/2011 |
| WO | 2013172538 A1 | 11/2013 |

OTHER PUBLICATIONS

Communication dated Jan. 29, 2015, issued by the European Patent Office in counterpart European Application No. 14170679.6.
Communication dated Mar. 31, 2015, issued by the European Patent Office in counterpart European Application No. 14170679.6.
International Search Report dated Sep. 16, 2014 issued in International Application No. PCT/KR2014/004913 (PCT/ISA/210).
Written Opinion dated Sep. 16, 2014 issued in International Application No. PCT/KR2014/004913 (PCT/ISA/237).
Communication dated Apr. 30, 2015 issued by European Patent Office in counterpart European Application No. 14170679.6.

* cited by examiner

MOUNTING CURVED DISPLAY DEVICE ON A CURVED PATH AND MOVING ALONG THE PATH

CROSS-REFERENCE TO RELATED APPLICATION

This application claims priority from Korean Patent Application No. 10-2013-0120052, filed on Oct. 8, 2013, in the Korean Intellectual Property Office, the disclosure of which is incorporated herein by reference, in its entirety.

BACKGROUND

1. Technical Field

Apparatuses and methods consistent with exemplary embodiments relate to a display apparatus and a display method using the same. More particularly, the exemplary embodiments relate to a display apparatus including a curved display unit which moves laterally along a guide member, and a display method using the same.

2. Description of the Related Art

As display panels are used as display apparatuses of television (TV) receivers, providing a large screen area in the display panels is rapidly increasing. However, a difference occurs between a point of view which is obtained when a viewer looks at a central portion of the screen and a point of view which is obtained when the viewer looks at either end of the screen. This difference which occurs is increased due to the large area of the screen.

The screen issues in the display panels in the large-scale TV receivers are increase in glare. The difference between points of view is improved with use of a curved display panel which is concavely curved with respect to a user.

Recently, research on the addition of various functions to TV receivers employing the curved display panels has progressed.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display apparatus capable of easily viewing a desired portion of an image by moving the display apparatus to a desired location through a simple operation of a user with respect to the still image, such as a panorama view image having a large aspect ratio or a virtual view image which is imaged with 360 degrees, and a display method using the same.

According to an aspect of an exemplary embodiment, there is provided a display apparatus. The display apparatus may include: a curved display; a guide member on which the curved display is mounted to slidably move and configured to provide a curved path concavely formed with respect to a user; and a driver configured to move the curved display along the guide member. The guide member may include left and right frames vertically disposed at intervals; a lower rail of which both ends are coupled to lower ends of the left and right frames; and an upper rail of which both ends are coupled to upper ends of the left and right frames and which is parallel to the lower rail.

The curved path may correspond to an arc in which a distance to the curved display from the user location is a radius.

The curved path may be formed to have the same curvature as the curved display.

The driver may include a plurality of driving wheels rotatably installed in a lower portion of the curved display and configured to be guided in the lower rail; and a plurality of driving motors installed in the plurality of driving wheels.

The display apparatus may further include at least one idle wheel rotatably installed in an upper portion of the curved display.

The display apparatus may further include a face recognition camera disposed in a front center of the curved display.

The display apparatus may further include a controller configured to analyze a face image imaged through the face recognition camera in order to determine a direction to which a front face of a user is directed, and drive the driver to move the curved display to a location which corresponds to the direction to which the front face of the user is directed.

Content displayed in the curved display may be a still image, and the controller may selectively display a portion of the still image according to movement of the curved display.

According to an aspect of an exemplary embodiment, there is provided a display method. The display method may include: recognizing a face of a user; determining a direction to which a front face of the user is directed; and moving a curved display apparatus along a curved path in response to the direction to which the front face of the user is directed. The curved display apparatus may display one portion of a still image, and the curved display apparatus may display another portion of the still image according to movement of the curved display apparatus.

The recognizing may include imaging the face of the user through a camera installed in a front of the curved display apparatus; comparing a currently imaged face image of the user with a pre-stored front face image of the user; and determining a direction to which the face of the user is rotated and a rotation angle.

The moving of the curved display apparatus may include setting the curved display apparatus so that a center of the curved display apparatus corresponds to a center of the front face of the user.

The center of the curved display apparatus may be set to a location in which the direction to which the front face of the user is directed, and a tangent of an arc formed by a curvature of the curved display apparatus, forms a right angle.

The still image may be a panorama view image. The curved display apparatus may display an end most portion of one side or the other side of the panorama view image in response to the direction, to which the front face of the user is directed, being fixed to a location which exceeds a movable range of the curved display apparatus, over a preset period of time.

The still image may be a virtual view image. The curved display apparatus may rotate the virtual view image to one direction or the other direction at a preset speed in response to the direction, to which the front face of the user is directed, being fixed to a location which is out of a movable range of the curved display apparatus, over a preset period of time.

An aspect of an exemplary embodiment may provide a display apparatus, including: a non-linear display; a guide member on which the non-linear display is mounted to move in a slidable manner, and configured to provide a non-linear path formed with respect to a direction a user is looking toward; a driver configured to move the non-linear display along the guide member; an image acquirer configured to acquire an image of a user viewing the non-linear display; and a controller configured to slide the non-linear display based on the acquired image so that a center of the non-linear display faces a direction that the user is looking toward.

The non-linear display may be a curved display and the guide member has a curved concave shape.

The image acquirer may include a face recognition camera disposed in a front center of the curved display.

The driver may include: a plurality of driving wheels installed rotatably in a lower portion of the curved display and configured to be guided in the lower rail; and a plurality of driving motors installed in the plurality of driving wheels.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION OF THE EXEMPLARY EMBODIMENTS

Figure 1:
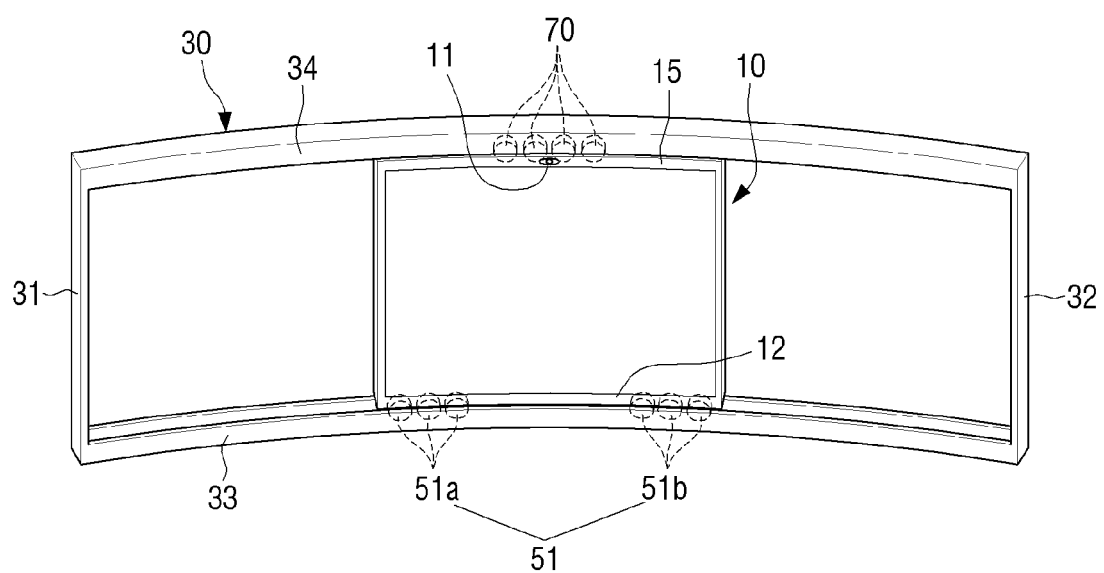
FIG. 1 is a perspective view illustrating a display apparatus, according to an exemplary embodiment.

Hereinafter, exemplary embodiments will be described in more detail with reference to the accompanying drawings.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 2:
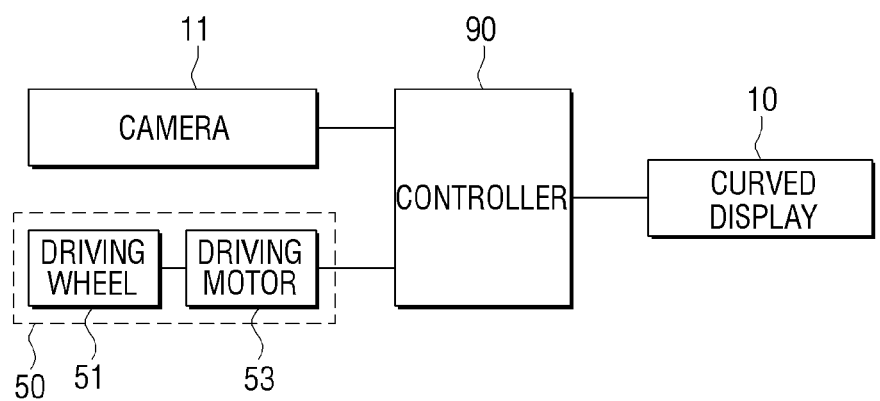
FIG. 2 is a block diagram illustrating a display apparatus, according to an exemplary embodiment.

Referring to FIGS. 1 and 2, a display apparatus according to an exemplary embodiment includes a curved display 10, a guide member 30, a driver 50, a plurality of idle wheels 70, and a controller 90.

The curved display 10 is formed in a curved structure having a predetermined curvature in which a side at which a viewer (hereinafter, referred to as 'a user') looks is concave. The curved display 10 may prevent an image from being distorted when viewed toward both ends of a display region in a general flat display (not shown). In the exemplary embodiment, the curved display 10 may be a curved TV set.

The curved display 10 may include a camera 11 disposed in a front center thereof and configured to recognize a face of a user. The controller 90 configured to control an image to be displayed in the curved display 10 and control the driver 50 may be embedded in an inside of the curved display 10.

The guide member 30 forms a path in which the curved display 10 may move laterally on the basis of the direction that the user is facing. The path may be a curved path having a curved shape formed in a concave manner to a predetermined curvature with respect to the user, like the curved display 10.

The curved path may be an arc in which a distance from the user to the curved display, based on the user, is a radius.

The guide member 30 may function to guide the curved display 10 to a location which corresponds to a direction (for example, the eyes of the user) toward which the face of the user is directed.

The guide member 30 includes a left frame 31 and a right frame 32 vertically disposed in the left and right of the curved display 10, a lower rail 33 of which both ends are coupled to lower ends of the left and right frames 31 and 32, and an upper rail 34 of which both ends are coupled to upper ends of the left and right frames 31 and 32, and which is parallel to the lower rail 33.

The lower and upper rails 33 and 34 may form the curved path, and have a similar curvature to the curved display 10, or may have the same curvature as the curved display. The lower rail 33 slidably supports a plurality of driving wheels 51 of the driver 50, and the upper rail 34 slidably supports the plurality of idle wheels 70.

The driver 50 includes the plurality of driving wheels 51 and a plurality of driving motors 53 configured to drive the plurality of driving wheels 51.

Portions 51a of the plurality of driving wheels 51 are disposed in a left lower end of the curved display 10, and other portions 51b thereof are disposed in a right lower end of the curved display 10.

Figure 3:
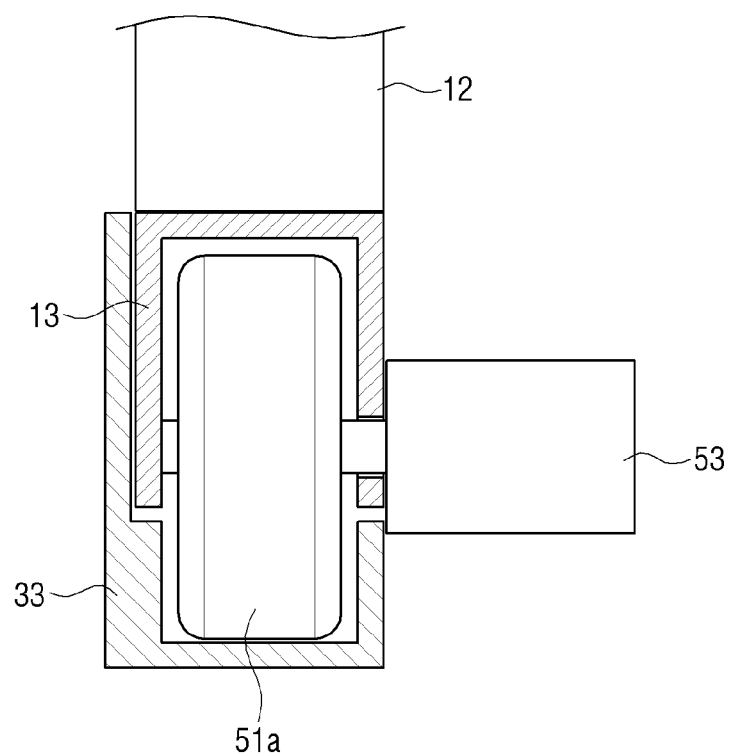
FIG. 3 is a partial cross-sectional view illustrating a driver illustrated in FIG. 1.
Figure 4:
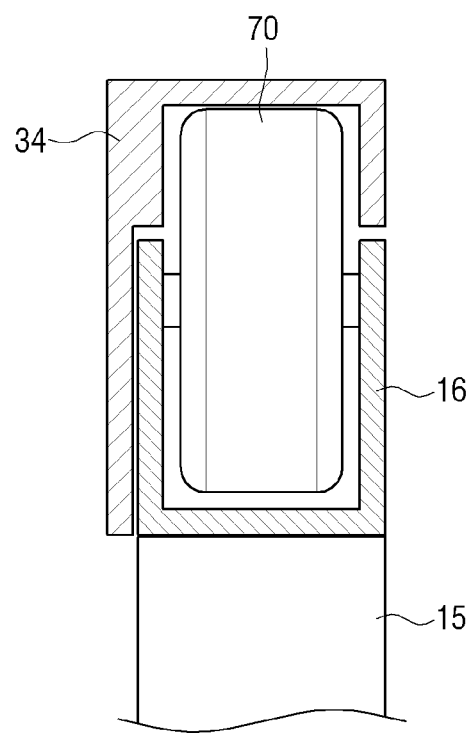
FIG. 4 is a partial cross-sectional view illustrating an idle wheel illustrated in FIG. 1.

In an exemplary embodiment, three driving wheels 51 are respectively disposed in the left and right sides of the curved display 10. However, the number of driving wheels 51 is not limited thereto, and at least one driving wheel may be respectively disposed in the left and right of the curved display 10. The plurality of driving wheels 51 may be rotatably supported by a fixing bracket 13 fixed to a lower end 12 of the curved display 10 as illustrated in FIG. 3.

The plurality of driving motors 53 are disposed in the plurality of driving wheels 51 and electrically coupled to the controller 90. In another exemplary embodiment, the plurality of driving motors 53 may be disposed in at least one of the left three driving wheels 51a and at least one of the right three driving wheels 51b. The remaining wheels 51 to which the driving motor 53 is not installed may serve as idle wheels.

The controller 90 may receive a face image of the user which is obtained and imaged through camera 11, compare the currently imaged face image with a front face image of the user which is pre-stored in a memory of the controller 90 through a pre-stored face recognition program which is known in the related art, and determine a rotation direction and rotation angle of the face.

The controller 90 transmits to the plurality of driving motors 53 a predetermined driving signal which corresponds to the rotation direction (a left direction or a right direction)

and the rotation angle of the face of the user. Therefore, the plurality of driving motors 53 drive the plurality of driving wheels so that the curved display 10 moves to a location in which the center of the curved display 10 coincides with the face center of the user.

The camera 11 may image the face of the user at preset time intervals, and transmit the imaged face of the user to the controller 90. The controller 90 may compare each imaged image with the preset image, provide the comparison result to driver 50, and move the curved display 10 in real time according to the direction in which the front face of the user is directed.

Figure 5:
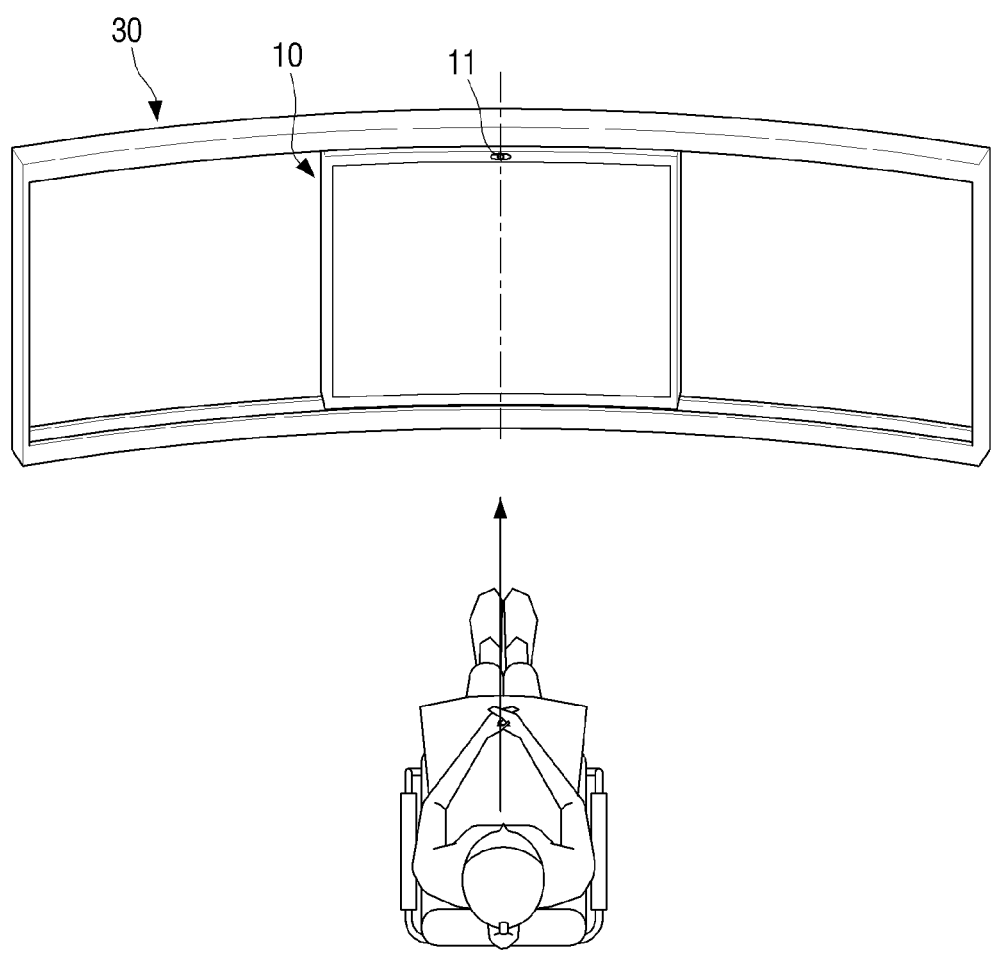
FIGS. 5 to 7 are schematic diagrams illustrating examples in which a curved display unit moves to a point to which eyes of a user are directed.
Figure 6:
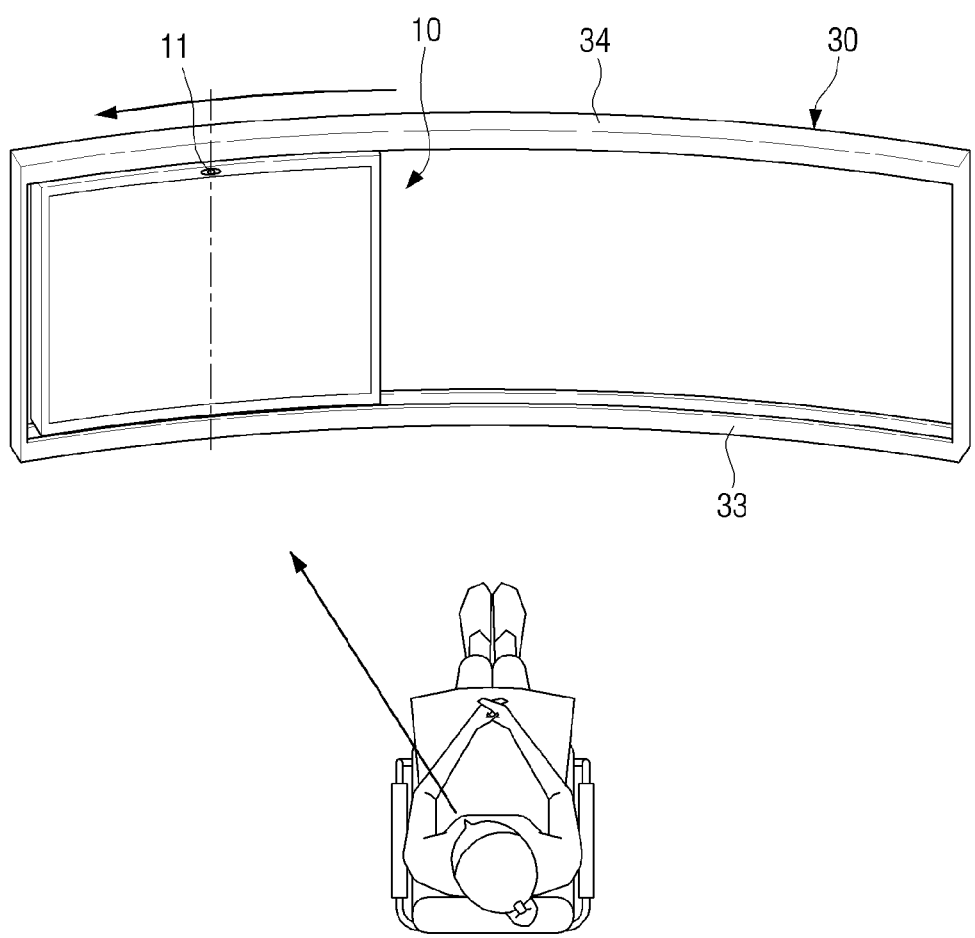
Figure 7:
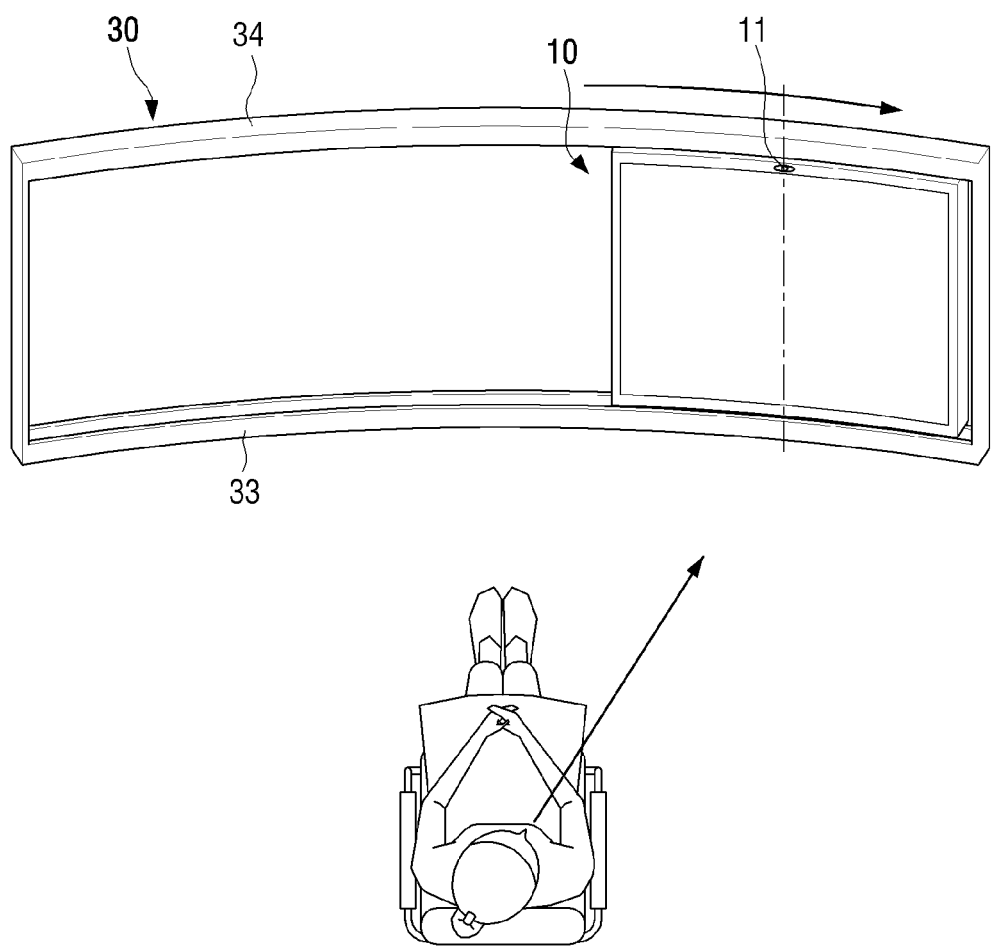

For example, in response to the user looking at the front of the curved display 10 (see FIG. 5), and then the face of the user is directed to the left direction (see FIG. 6) or to the right direction (see FIG. 7), the plurality of driving motors 53 are driven by the controller 90, and the curved display 10 moves a predetermined distance along the upper and lower rails 34 and 33 of the guide member 30 having the curved path.

The curved display 10 may display general moving image content and a still image. The still image may include a panorama view image or a virtual view image.

Figure 8:
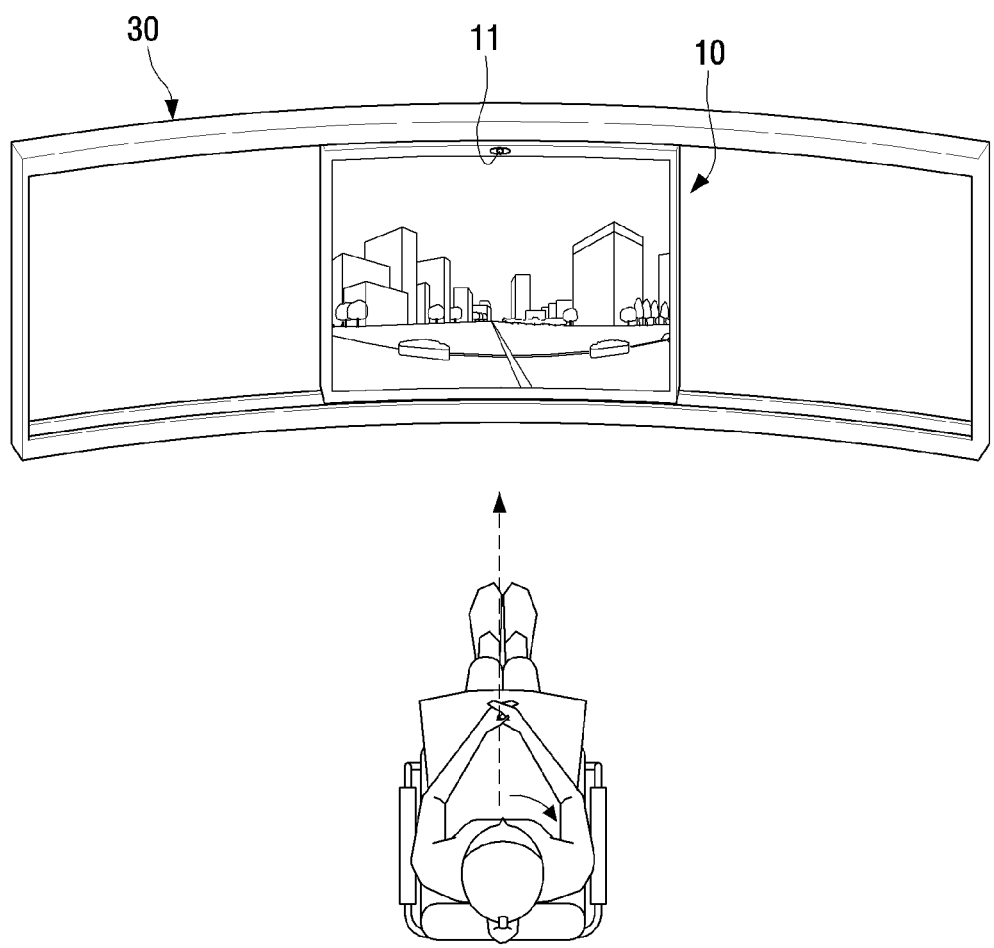
FIGS. 8 to 11 are schematic diagrams illustrating examples in which a portion of a panorama view image is selectively displayed according to movement of a curved display unit.

In response to the panorama view image being displayed as the still image, the curved display 10 displays a portion of the panorama view image which corresponds to a direction that the user is looking towards. That is, as illustrated in FIG. 8, an approximate central portion of the panorama view image is displayed in response to the direction that the user is looking towards.

Figure 9:
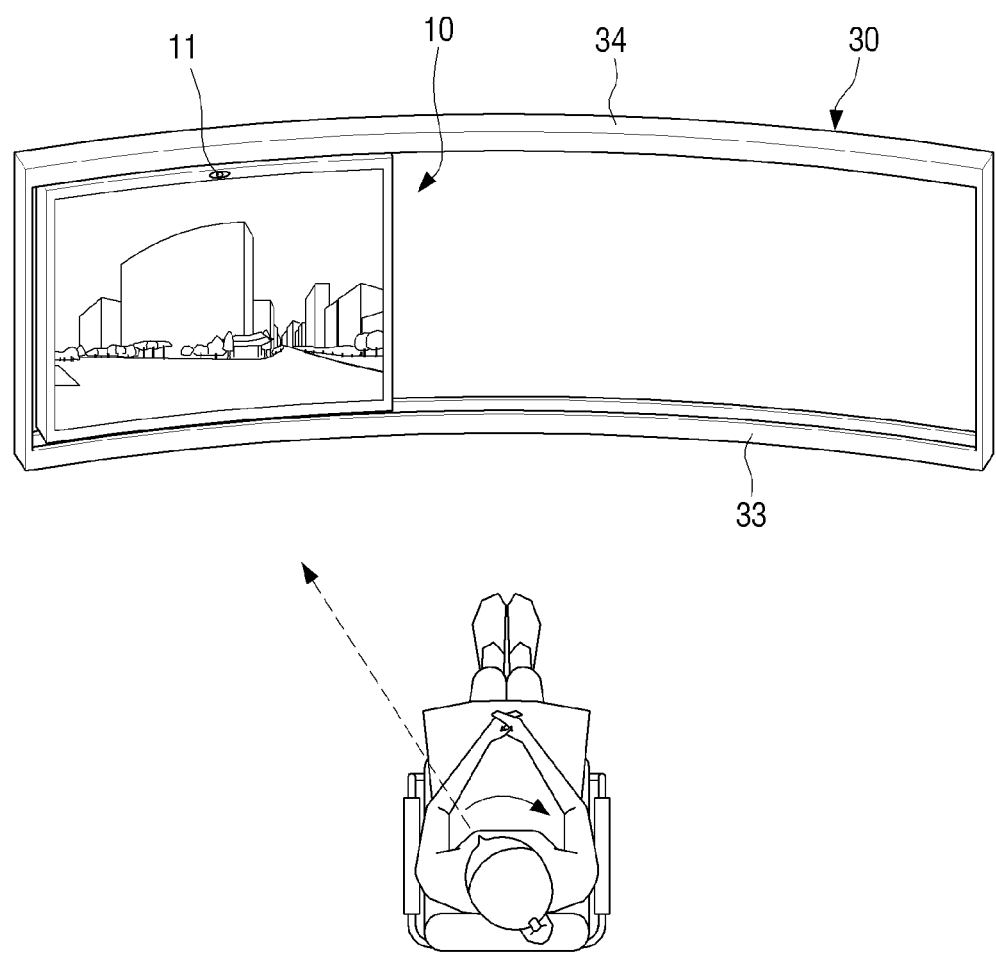
Figure 10:
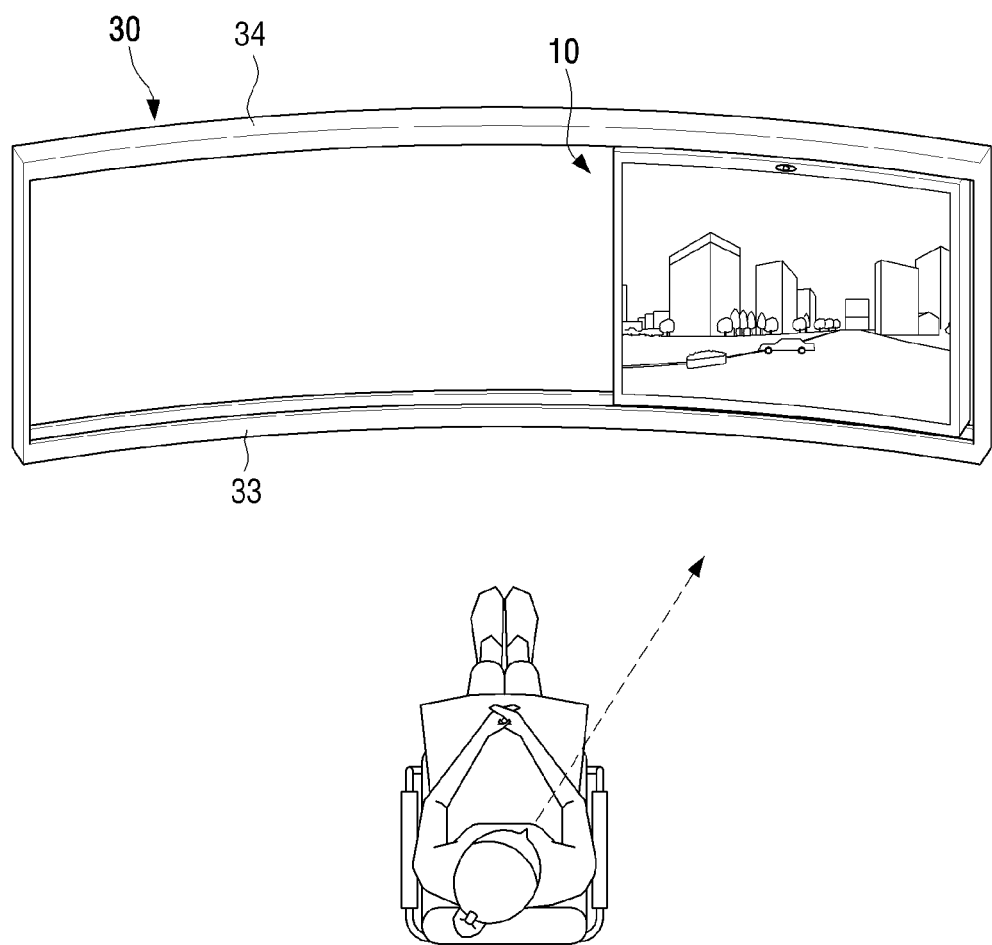
Figure 11:
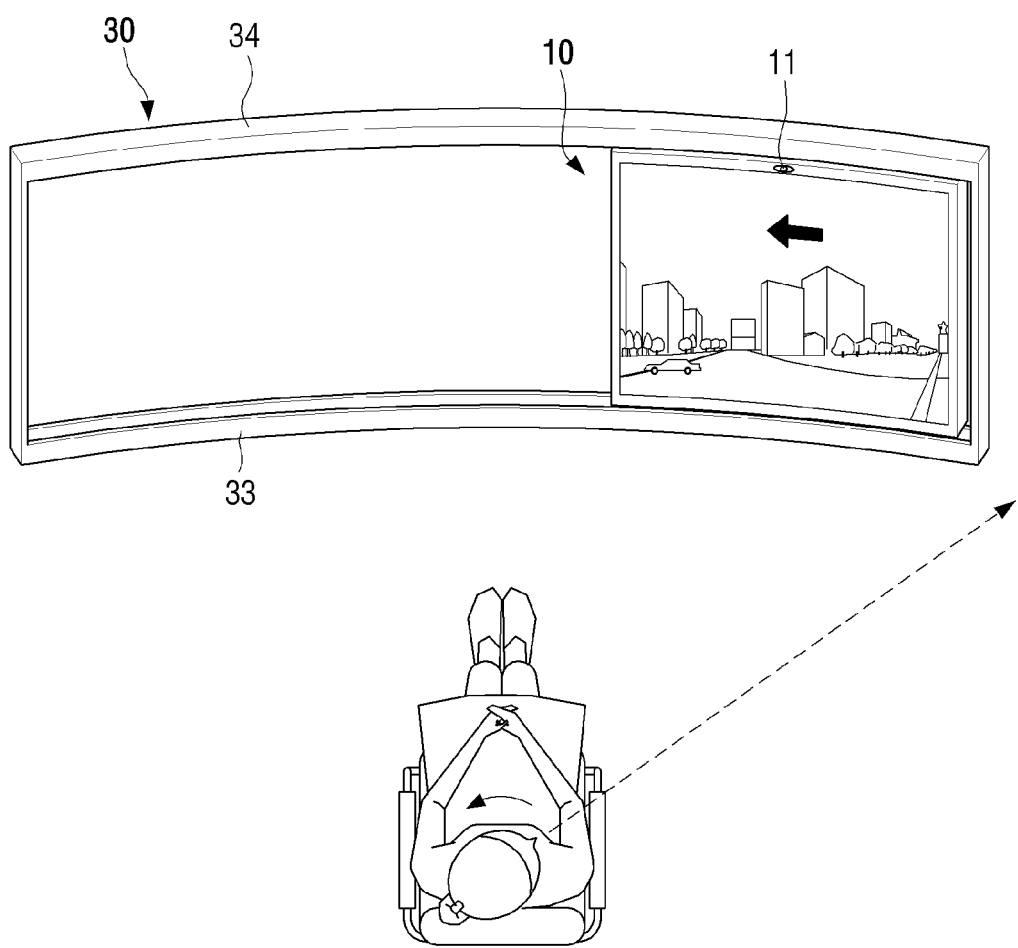

As illustrated in FIG. 9, in response to the face direction of the user being rotated to the left direction by a predetermined angle, the controller 90 moves the curved display 10 to a location which corresponds to the rotation direction and the rotation direction of the face of the user, and simultaneously displays a left portion of the panorama view image.

Further, in response to the front face of the user being directed to a predetermined direction, that is, to a point beyond a boundary, in which the curved display unit 10 may move to the left direction, over a predetermined period of time, the curved display 10 displays a left endmost portion of the panorama view image.

To the contrary, in response to the face direction of the user being rotated to the right direction by a predetermined angle, the controller 90 moves the curved display 10 to a location which corresponds to the rotation direction and the rotation angle of the face of the user, and simultaneously displays a right portion of the panorama view image.

At this time, in response to the front face of the user being directed to a predetermined direction, that is, to a point beyond a boundary, in which the curved display 10 may move in a direction towards the right side of the display apparatus, over a predetermined period of time, the curved display 10 displays a right end most portion of the panorama view image.

Further, the virtual view image may be a still image which is imaged with 360 degrees like a street view image which may be provided in a general Internet map service.

In the display apparatus according to an exemplary embodiment, in response to the virtual view image being displayed in the curved display 10, the controller 90 may move the curved display 10 along the direction to which the face of the user is directed, and simultaneously the curved display 10 may display a portion of the virtual view image which corresponds to a moved location of the curved display 10.

In response to the face direction of the user being beyond a movable range of the curved display 10 and fixed to a point out of the movable range over a preset period of time, the controller consistently rotates a screen in a left direction or a right direction, to which the face is directed, at a preset speed.

According to the above-described exemplary embodiment, in response to a general moving image being displayed in the curved display 10, the curved display 10 moves in the direction, to which the face of the user is directed, and moves to a location in which the center of the face of the user coincides with the center of the curved display 10 (that is, a location in which a straight line which corresponds to the direction, in which the face of the user is directed, forms a right angle with respect to a tangent of an arc formed by the curved display 10), and thus the user may view the image displayed in the curved display 10 in a direction in which the image is not distorted.

According to the above-described exemplary embodiment, a head of the user is rotated to the left direction or the right direction by a predetermined angle, and thus a still image which corresponds to the rotation angle may be displayed in the curved display 10. Therefore, the user may easily control the screen without a separate operation of a remote controller.

The foregoing exemplary embodiments and advantages are merely exemplary and are not to be construed as limiting. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display apparatus, comprising:
   a curved display;
   a guide member on which the curved display is mounted to slidably move, and configured to provide a curved concave path formed with respect to a user; and
   a driver configured to move the curved display along the guide member,
   wherein the guide member includes left and right frames vertically disposed at intervals, a lower rail of which both ends are coupled to lower ends of the left and right frames, and an upper rail of which both ends are coupled to upper ends of the left and right frames and which is parallel to the lower rail, and
   wherein the driver includes:
   a plurality of driving wheels rotatably installed in a lower portion of the curved display and configured to be guided in the lower rail; and
   a plurality of driving motors installed in the plurality of driving wheels.

2. The display apparatus as claimed in claim 1, wherein the curved path corresponds to an arc in which a distance between the curved display and the user is a radius.

3. The display apparatus as claimed in claim 1, wherein the curved path has the same curvature as the curved display.

4. The display apparatus as claimed in claim 1, further comprising at least one idle wheel rotatably installed in an upper portion of the curved display.

5. The display apparatus as claimed in claim 1, further comprising a face recognition camera disposed in a front center of the curved display.

6. The display apparatus as claimed in claim 5, further comprising a controller configured to analyze a face image imaged through the face recognition camera in order to determine a direction to which a front face of a user is directed, and drive the driver to move the curved display to a location which corresponds to the direction to which the front face of the user is directed.

7. The display apparatus as claimed in claim 6, wherein content displayed in the curved display is a still image, and the controller selectively displays a portion of the still image according to movement of the curved display.

8. A display method, comprising:
recognizing a face of a user;
determining a direction to which a front face of the user is directed; and
moving a curved display apparatus along a curved path in response to the direction to which the front face of the user is directed,
wherein the curved display apparatus displays one portion of a still image, and the curved display apparatus displays the other portion of the still image according to movement of the curved display apparatus which corresponds to a direction that the user is looking toward,
wherein the still image is a panorama view image, and
wherein the curved display apparatus displays an end most portion of one side or the other side of the panorama view image in response to the direction, to which the front face of the user is directed, being fixed to a location which exceeds a movable range of the curved display apparatus over a preset period of time.

9. The display method as claimed in claim 8, wherein the recognizing includes:
imaging the face of the user through a camera installed in a front of the curved display apparatus;
comparing a currently imaged face image of the user with a pre-stored front face image of the user; and
determining a direction to which the face of the user is rotated and a rotation angle.

10. The display method as claimed in claim 9, wherein the moving of the curved display apparatus includes setting the curved display apparatus so that a center of the curved display apparatus corresponds to a center of the front face of the user.

11. The display method as claimed in claim 10, wherein the center of the curved display apparatus is set to a location in which the direction, to which the front face of the user is directed, and a tangent of an arc formed by a curvature of the curved display apparatus form a right angle.

12. The display method as claimed in claim 8, wherein the still image is a virtual view image.

13. A display method, comprising:
recognizing a face of a user;
determining a direction to which a front face of the user is directed; and
moving a curved display apparatus along a curved path in response to the direction to which the front face of the user is directed,
wherein the curved display apparatus displays one portion of a still image, and the curved display apparatus displays the other portion of the still image according to movement of the curved display apparatus which corresponds to a direction that the user is looking toward,
wherein the still image is a virtual view image, and
wherein the curved display apparatus rotates the virtual view image to one direction or the other direction at a preset speed in response to the direction, to which the front face of the user is directed, being fixed to a location which is out of a movable range of the curved display apparatus over a preset period of time.

14. A display apparatus, comprising:
a non-linear display;
a guide member on which the non-linear display is mounted to move in a slidable manner, and configured to provide a non-linear path formed with respect to a direction a user is looking toward;
a driver configured to move the non-linear display along the guide member;
an image acquirer configured to acquire an image of a user viewing the non-linear display; and
a controller configured to slide the non-linear display based on the acquired image so that a center of the non-linear display faces a direction that the user is looking toward,
wherein the non-linear display is a curved display and the guide member has a curved concave shape, and
wherein the driver includes:
a plurality of driving wheels installed rotatably in a lower portion of the curved display and configured to be guided in the lower rail; and
a plurality of driving motors installed in the plurality of driving wheels.

15. The display apparatus of claim 14, wherein the image acquirer comprises a face recognition camera disposed in a front center of the curved display.

* * * * *